(12) United States Patent
Jones et al.

(10) Patent No.: US 11,104,392 B2
(45) Date of Patent: Aug. 31, 2021

(54) SPROCKET AND IDLER SHARING COMMON WHEEL

(71) Applicant: Caterpillar Inc., Deerfield, IL (US)

(72) Inventors: Benjamin Isaac Jones, Bartonville, IL (US); David J. Hakes, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 390 days.

(21) Appl. No.: 16/177,619

(22) Filed: Nov. 1, 2018

(65) Prior Publication Data

US 2020/0140025 A1    May 7, 2020

(51) Int. Cl.
   *B62D 55/14*    (2006.01)
   *B62D 55/125*    (2006.01)
   *B62D 55/32*    (2006.01)

(52) U.S. Cl.
   CPC ........... *B62D 55/14* (2013.01); *B62D 55/125* (2013.01); *B62D 55/32* (2013.01)

(58) Field of Classification Search
   CPC ...... B62D 55/12; B62D 55/125; B62D 55/13; B62D 55/135; B62D 55/14; B62D 55/145; B62D 55/32
   See application file for complete search history.

(56) References Cited

U.S. PATENT DOCUMENTS

| | | | |
|---|---|---|---|
| 1,479,349 A * | 1/1924 | Wickersham | B62D 55/12 305/199 |
| 3,135,126 A | 6/1964 | Militana | |
| 3,869,931 A * | 3/1975 | Boggs | F16H 55/36 474/151 |
| 8,070,240 B2 | 12/2011 | Zheng et al. | |
| 9,469,156 B2 * | 10/2016 | Bueter | B60B 3/004 |
| 2005/0253453 A1 | 11/2005 | Miller | |
| 2012/0153713 A1 * | 6/2012 | Yelistratov | B62D 55/32 305/137 |
| 2013/0038119 A1 | 2/2013 | Griffith | |
| 2016/0159415 A1 * | 6/2016 | Zimmer | B62D 55/08 180/9.62 |
| 2018/0099708 A1 * | 4/2018 | Johannsen | C21D 1/10 |

FOREIGN PATENT DOCUMENTS

| | | | | |
|---|---|---|---|---|
| FR | 826131 A | * | 3/1938 | ............. B62D 55/12 |
| GB | 539809 A | | 9/1941 | |

* cited by examiner

*Primary Examiner* — Kip T Kotter
(74) *Attorney, Agent, or Firm* — Law Office of Kurt J. Fugman LLC

(57) ABSTRACT

A sprocket and an idler sharing a common wheel member are manufactured by a method that includes providing a common wheel member, providing an idler flange annular attachment, and providing a tooth annular attachment.

15 Claims, 4 Drawing Sheets

SPROCKET AND IDLER SHARING COMMON WHEEL

TECHNICAL FIELD

The present disclosure relates to sprockets or idlers used on equipment utilized in the earth moving, construction, agriculture, and mining industries or the like to drive or guide the track chain assemblies employed by such equipment. Specifically, the present disclosure relates to a method and apparatus that allows more versatility in creating such sprockets and idlers while also reducing the associated costs of making and storing such sprockets and idlers.

BACKGROUND

Machines, such as those used in the earth moving, construction, agriculture and mining industries endless track drives with track chain assemblies to propel the machine often on uneven terrain such as dirt, rocks, sand, etc.

Sprocket wheels such as drive sprocket wheels are often employed with teeth that engage the track bushing or track pins of the track chain assembly, causing the track chain to move about the undercarriage of the machine.

Idler wheels are also often employed that are similarly configured as sprocket wheels except that the idler wheels lack teeth and only have an idler flange that rests between the track links of the track chain assembly, helping to restrict lateral movement of the track chain assembly such that the track chain assembly does not fall off the undercarriage of the machine.

Current sprocket and idler wheels often have geometry that is difficult to forge due to the shape of the engaging surfaces (e.g., the sprocket teeth or the idler flange). Also, creating the sprocket wheel and idler wheels can be expensive due to the heat treating process.

Moreover, manufacturing and overhead costs (e.g. storing inventory) for current sprocket and idler wheels can be more expensive than desirable since the sprocket and idler wheels are low volume components.

U.S. Pat. No. 8,070,240 to Zheng et al. discloses a plurality of sprocket teeth members that are attached to a wheel using a cylindrical pin. Zheng does not address how to reduce manufacturing costs of both idler wheel and sprocket wheels simultaneously and may itself be more expensive than desired.

Accordingly, Zheng does not adequately address the aforementioned problems since the cost of attaching a plurality of sprocket teeth members to a wheel can be costly and time consuming. Also, Zheng does not address how to reduce the cost of making an idler wheel.

SUMMARY

A wheel kit according to an embodiment of the present disclosure comprises a common wheel member defining a longitudinal axis, a radial direction, and a circumferential direction. The wheel kit may further comprise a first annularly configured attachment, and a second annularly configured attachment. The second annularly configured attachment is differently configured than the first annularly configured attachment and both the first annularly configured attachment and the second annularly configured attachment are configured to be attached to the common wheel member.

A wheel assembly according to an embodiment of the present disclosure may comprise a common wheel member defining a longitudinal axis, a radial direction, and a circumferential direction. The common wheel member may include an inner radial hub, an outer radial support flange, and a web connecting the inner radial hub to the outer radial support flange. The wheel assembly may further comprise a ring member defining an inner continuous circumferential surface engaging the outer radial support flange.

A sprocket and an idler sharing a common wheel member may be manufactured by a method according to an embodiment of the present disclosure. The method may comprise providing a common wheel member, providing an idler flange annular attachment, and providing a tooth annular attachment.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 3:
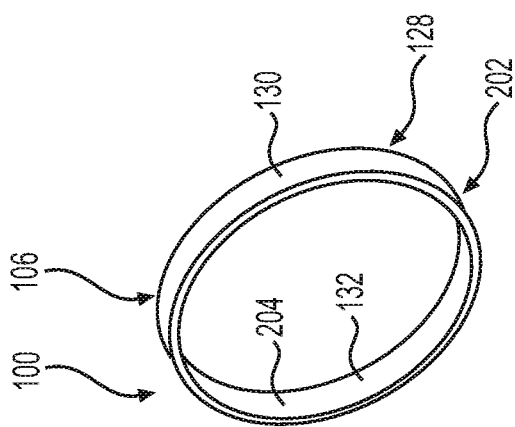
FIG. 3 is a perspective view of an embodiment of another annularly configured attachment such as an idler flange annular attachment according to an embodiment of the present disclosure that may be attached to the common wheel member of FIG. 1.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of an apparatus or a method for providing a sprocket wheel or an idler wheel sharing a common wheel member will now be discussed. Since the teeth of the sprocket are separate from the common wheel member, it may not be necessary to induction harden the teeth as has been done in the past. Also, different material, coatings, or heat treatment process may be used on the separate toothed member than on the common wheel member. Similar statements may be made with regard to the idler flange which may be attached and fabricated separately from the common wheel member.

Looking at FIGS. 1 thru 6, a wheel kit 100 according to an embodiment of the present disclosure will be described. The wheel kit 100 may comprise a common wheel member 102 defining a longitudinal axis L, a radial direction R, and a circumferential direction C. The wheel kit 100 may further comprise a first annularly configured attachment 104, and a second annularly configured attachment 106. The second annularly configured attachment 106 is differently configured that the first annularly configured attachment 104 and both the first annularly configured attachment 104 and the second annularly configured attachment 106 are configured to be attached to the common wheel member 102.

Figure 1:
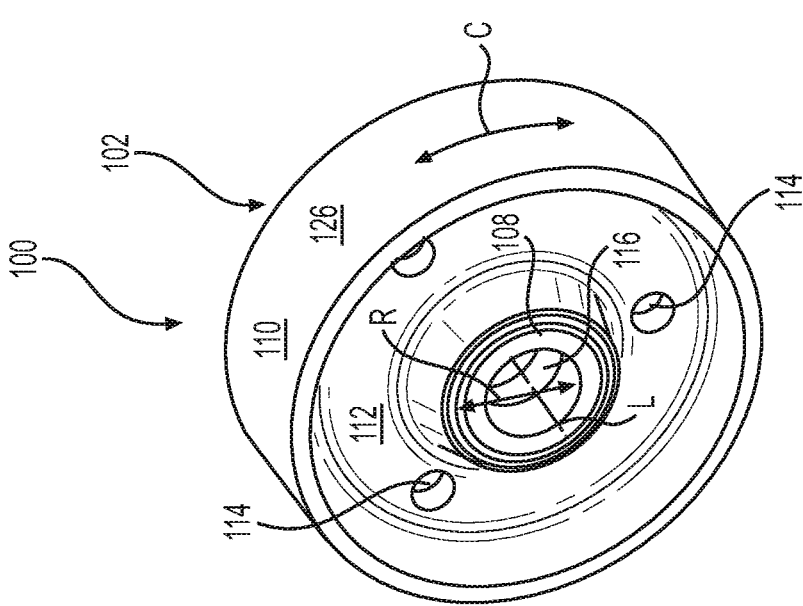
FIG. 1 is a perspective view of a common wheel member used to create a sprocket wheel or an idler wheel according to an embodiment of the present disclosure.

As best seen in FIG. 1, the common wheel member 102 includes an inner radial hub 108, an outer radial support flange 110, and a web 112 connecting the inner radial hub 108 to the outer radial support flange 110. The web 112 may define a plurality of apertures 114 (e.g. bolt holes for fastening the wheel to the undercarriage of a machine) extending longitudinally through the web 112 and the inner radial hub 108 defines a central aperture 116 (for receiving a shaft of the undercarriage of the machine) extending longitudinally through the inner radial hub 108. In some embodiments, the common wheel member 102 is a unitary forged piece of material such as steel or the like. Other materials and configurations are possible.

Figure 2:
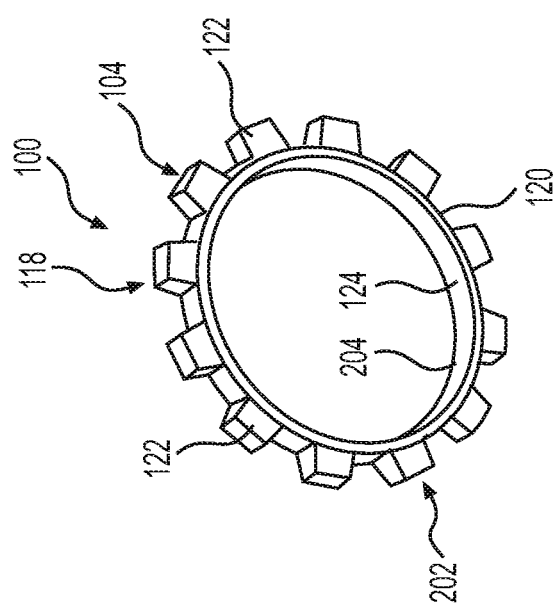
FIG. 2 is a perspective view of an embodiment of an annularly configured attachment such as a toothed annular attachment according to an embodiment of the present disclosure that may be attached to the common wheel member of FIG. 1.
Figure 4:
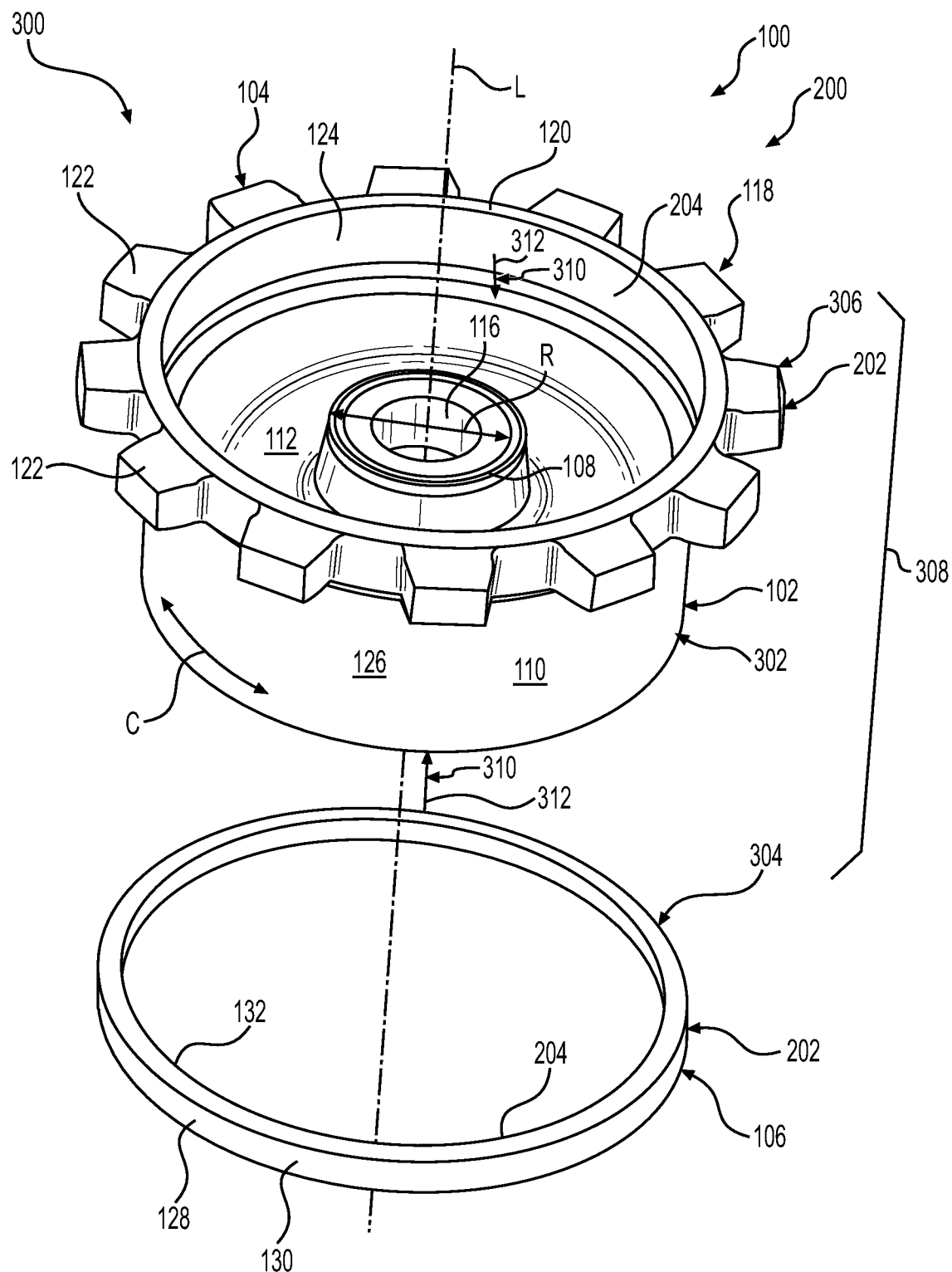
FIG. 4 is an exploded assembly view illustrating a method for attaching the toothed annular attachment of FIG. 2 or the idler flange annular attachment of FIG. 3 onto the common wheel member of FIG. 1 via a press-fit or interference fit operation, a welding operation, etc.
Figure 5:
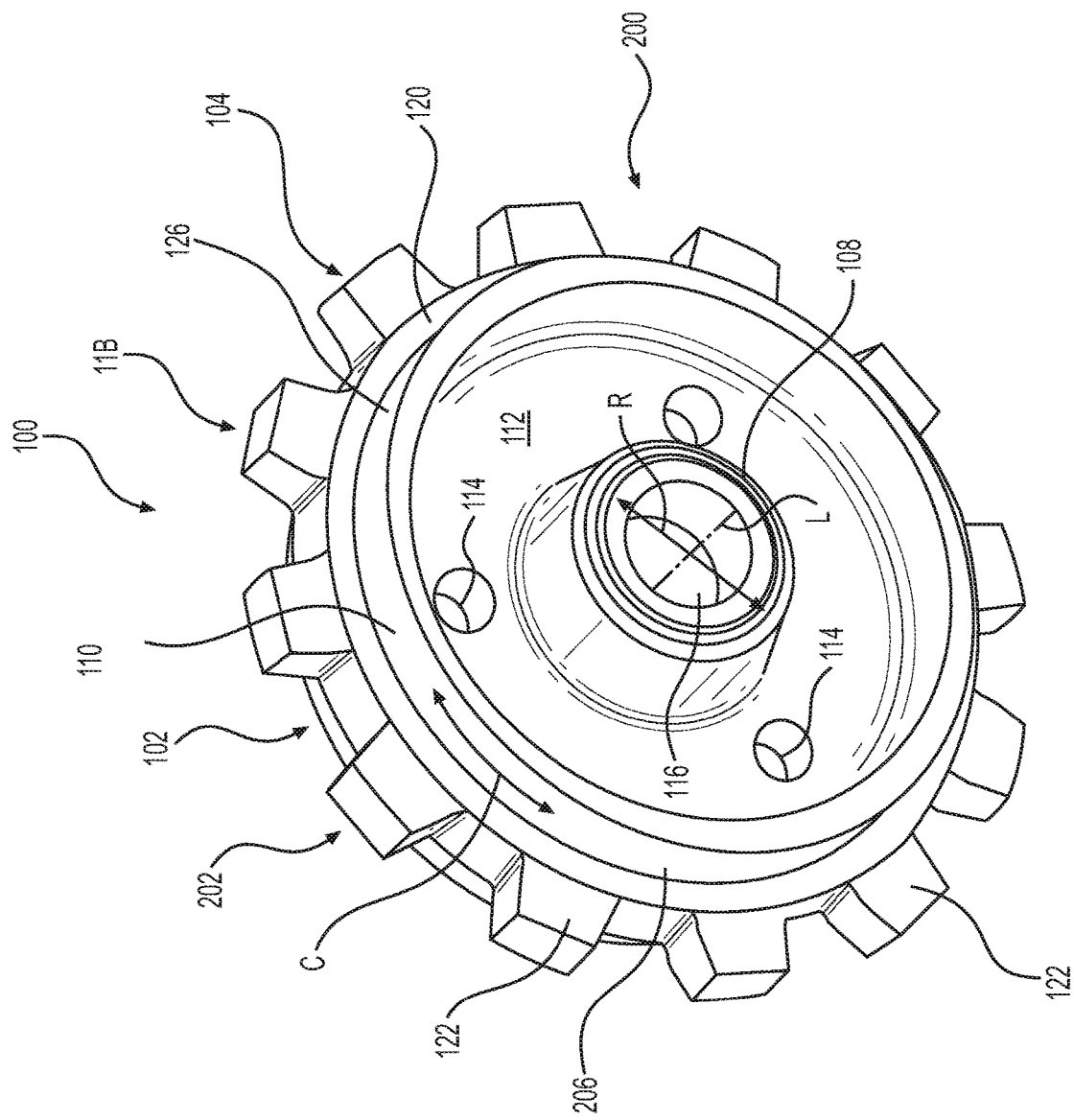
FIG. 5 is a perspective view of the fully assembled sprocket wheel achieved using the method of FIG. 4.

Referring now to FIGS. 2, 4 and 5, the first annularly configured attachment 104 may take the form of a toothed annular attachment 118 that is configured to be attached to the outer radial support flange 110. The toothed annular attachment 118 includes a complete circumferential ring 120 and a plurality of teeth 122 extending radially from the complete circumferential ring 120. The complete circumferential ring 120 defines an inner radial surface 124, while the outer radial support flange 110 of the common wheel member 102 defines an outer radial surface 126. The inner radial surface 124 is configured to engage the outer radial surface 126.

The toothed annular attachment 118 may be press-fit or interference fit onto the common wheel member 102. Alternatively, the toothed annular attachment 118 may be welded onto the common wheel member 102, etc. In some embodiments, the toothed annular attachment 118 comprises a different material than the common wheel member 102, or the toothed annular attachment 118 may be differently heat treated than the common wheel member 102, or the toothed annular attachment 118 may be differently coated than the common wheel member 102. Any combination of differing materials, heat treatment, and coatings are possible, etc.

Figure 6:
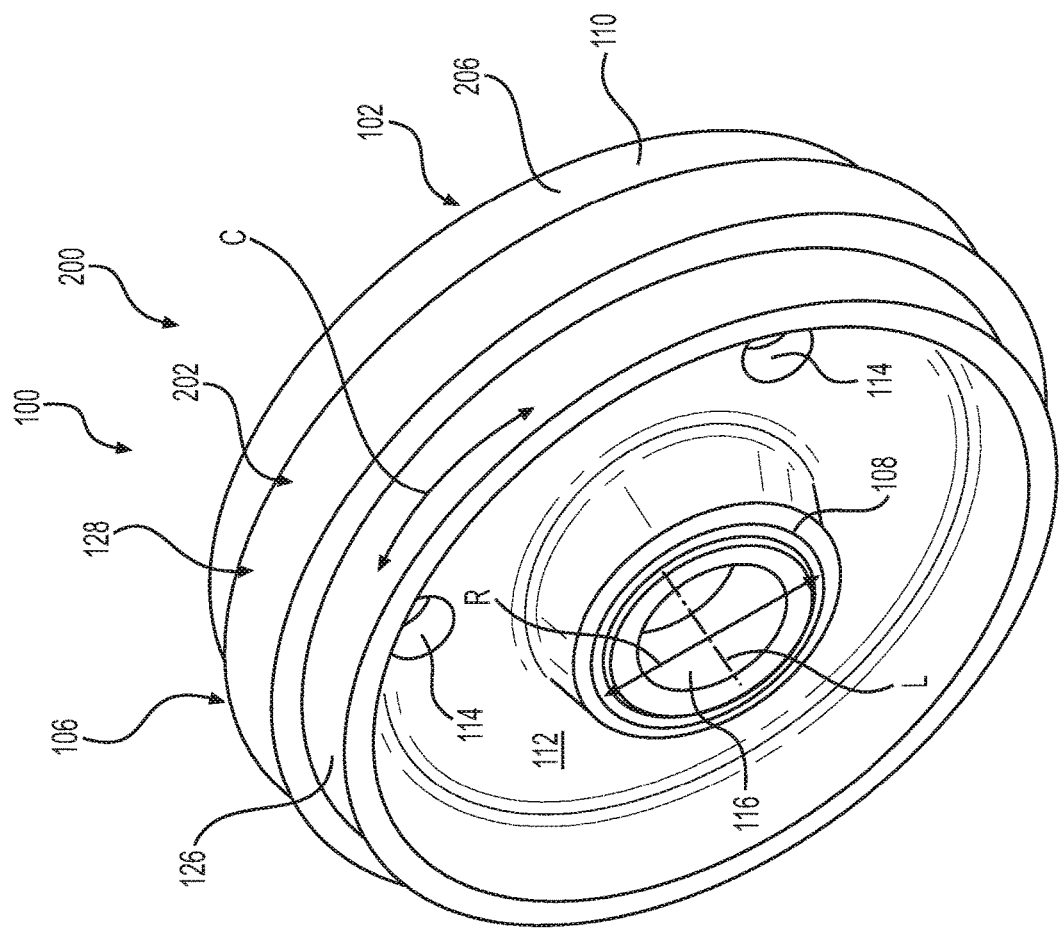
FIG. 6 is a perspective view of the fully assembled idler wheel achieved using the method of FIG. 4.

Looking now at FIGS. 3, 4 and 6, the second annularly configured attachment 106 is an idler flange annular attachment 128 that is configured to be attached to the outer radial support flange 110. Other configurations of the first and the second annularly configured attachments 104, 106 are possible. The idler flange annular attachment 128 includes a continuous circumferential ring 130 that defines an inside radial surface 132. The outer radial support flange 110 defines an outer radial surface 126, and the inside radial surface 132 is configured to engage the outer radial surface 126.

In particular embodiments, the idler flange annular attachment 128 is press-fit or interference fit onto the common wheel member 102. In other embodiments, the idler flange attachment 128 is welded onto the common wheel member 102, etc.

In some embodiments, the idler flange annular attachment 128 comprises a different material than the common wheel member 102, or the idler flange annular attachment 128 is differently heat treated than the common wheel member 102, or the idler flange annular attachment 128 is differently coated than the common wheel member 102. Any combination of differing materials, heat treatment, and coatings are possible, etc.

Turning now to FIGS. 5 and 6, a wheel assembly 200 comprising a common wheel member 102 defining a longitudinal axis L, a radial direction R, and a circumferential direction C. The common wheel member 102 may include an inner radial hub 108, an outer radial support flange 110, and a web 112 connecting the inner radial hub 108 to the outer radial support flange 110. The wheel assembly 200 may further comprise a ring member 202 defining an inner continuous circumferential surface 204 (see also FIGS. 2 and 3) engaging the outer radial support flange 110. In particular embodiments, the outer radial support flange 110 defines an outer continuous circumferential surface 206 that engages the inner continuous circumferential surface 204 of the ring member 202. Other configurations are possible.

The ring member 202 may take various forms in different embodiments. For instance, the ring member 202 may be a toothed annular attachment 118 including a plurality of teeth 122 extending radially from ring member 202 (see FIG. 5).

Or, the ring member 202 may be an idler flange annular attachment 128 lacking teeth (see FIG. 6). Other configurations are possible.

It should be noted that the ring member 202 in FIG. 5 and the ring member 202 in FIG. 6 may be identically configured except for the presence of teeth 122. That is to say, subtracting the teeth from the wheel assembly 200 of FIG. 5 would yield the wheel assembly 200 of FIG. 6, but not necessarily so.

Any of the components discussed herein may be made from any suitable material such as steel, iron, etc.

Any of the components discussed herein may be differently configured than what has been specifically discussed herein or shown in the drawings.

INDUSTRIAL APPLICABILITY

In practice, a wheel kit, a wheel assembly, or a ring member, etc. of any embodiment disclosed herein may be sold, bought, manufactured or otherwise obtained in an OEM (original equipment manufacturer) or after-market context. In some cases, various components, of the wheel kit, or wheel assembly may be provided as a retrofit for machines already in the field.

Focusing now on FIG. 4, a method 300 for providing a sprocket and an idler sharing a common wheel member is depicted. The method 300 may comprise providing a common wheel member (step 302), providing an idler flange annular attachment (step 304), and providing a toothed annular attachment (step 306).

As used herein, the term "providing" is to be interpreted broadly to include any manner of creating or obtaining a component.

In some embodiments, providing an idler flange annular attachment (step 304) and providing a toothed annular attachment (step 306) includes providing an idler flange annular attachment that is identically configured to the toothed annular attachment except that the idler flange annular attachment lacks teeth (step 308).

The method 300 may further comprise attaching either the idler flange annular attachment or the tooth annular attachment circumferentially to the common wheel member (step 310). The attaching may be accomplished via a press-fit or interference fit (step 312).

A sprocket and an idler sharing a common wheel may be manufactured according to any of the steps of the method 300.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A wheel kit comprising:
   a common wheel member defining a longitudinal axis, a radial direction, and a circumferential direction;
   a first annularly configured attachment; and
   a second annularly configured attachment;
   wherein the second annularly configured attachment includes a common ring member that is the same as that of the first annularly configured attachment, defining the same inside diameter except that the first annularly configured attachment includes teeth, while the second annularly configured attachment lacks teeth, and both the first annularly configured attachment and the second annularly configured attachment are configured to be attached to the common wheel member.

2. The wheel kit of claim 1 wherein the common wheel member includes an inner radial hub, an outer radial support flange, and a web connecting the inner radial hub to the outer radial support flange.

3. The wheel kit of claim 2 wherein the web defines a plurality of apertures extending longitudinally through the web and the inner radial hub defines a central aperture extending longitudinally through the inner radial hub.

4. The wheel kit of claim 3 wherein the common wheel member is a unitary forged piece of material.

5. The wheel kit of claim 2 wherein the first annularly configured attachment is a toothed annular attachment that is configured to be attached to the outer radial support flange.

6. The wheel kit of claim 5 wherein the toothed annular attachment defines an inner radial surface, the outer radial support flange defines an outer radial surface, and the inner radial surface is configured to engage the outer radial surface.

7. The wheel kit of claim 6 wherein the toothed annular attachment is press-fit or interference fit onto the common wheel member.

8. The wheel kit of claim 7 wherein the toothed annular attachment comprises a different material than the common wheel member, the toothed annular attachment is differently heat treated than the common wheel member, or the toothed annular attachment is differently coated than the common wheel member.

9. The wheel kit of claim 2 wherein the second annularly configured attachment is an idler flange annular attachment that is configured to be attached to the outer radial support flange.

10. The wheel kit of claim 9 wherein the idler flange annular attachment includes defines an inside radial surface, the outer radial support flange defines an outer radial surface, and the inside radial surface is configured to engage the outer radial surface.

11. The wheel kit of claim 10 wherein the idler flange annular attachment is press-fit or interference fit onto the common wheel member.

12. The wheel kit of claim 11 wherein the idler flange annular attachment comprises a different material than the common wheel member, the idler flange annular attachment is differently heat treated than the common wheel member, or the idler flange annular attachment is differently coated than the common wheel member.

13. A sprocket and an idler sharing a common wheel member manufactured by a method, the method comprising:
    providing the common wheel member;
    providing an idler flange annular attachment; and
    providing a toothed annular attachment;
    wherein providing the idler flange annular attachment and providing the toothed annular attachment includes providing the idler flange annular attachment that is identically configured to the tooth annular attachment except that the idler flange annular attachment lacks teeth.

14. The sprocket and the idler sharing the common wheel member manufactured according to the method of claim 13, the method further comprising attaching either the idler flange annular attachment or the toothed annular attachment circumferentially to the common wheel member.

15. The sprocket and the idler sharing the common wheel member manufactured according to the method of claim 14 wherein attaching is accomplished via a press-fit or interference fit.

* * * * *